(12) United States Patent
Meissner

(10) Patent No.: US 7,192,011 B2
(45) Date of Patent: Mar. 20, 2007

(54) TELESCOPING JACK UNIT

(76) Inventor: Jason Robert Meissner, 2974 CR 309, Cranfills Gap, TX (US) 76637

( * ) Notice: Subject to any disclaimer, the term of this patent is extended or adjusted under 35 U.S.C. 154(b) by 0 days.

(21) Appl. No.: 11/422,437

(22) Filed: Jun. 6, 2006

(65) Prior Publication Data

US 2006/0214147 A1    Sep. 28, 2006

Related U.S. Application Data

(63) Continuation-in-part of application No. 10/965,363, filed on Oct. 14, 2004.

(51) Int. Cl.
   *B60S 9/02*    (2006.01)
(52) U.S. Cl. ...................... 254/420; 254/418
(58) Field of Classification Search ............. 254/420, 254/418–426, 85
   See application file for complete search history.

(56) References Cited

U.S. PATENT DOCUMENTS

| 3,595,527 A | * | 7/1971 | Douglass ................. 254/420 |
| 6,176,470 B1 | * | 1/2001 | Breslin et al. ............ 254/420 |
| 6,361,023 B1 | * | 3/2002 | Peavler .................... 254/424 |
| 6,874,764 B2 | * | 4/2005 | Drake, III ................ 254/420 |
| 2004/0041138 A1 | * | 3/2004 | Drake, III ................ 254/420 |

* cited by examiner

*Primary Examiner*—Lee D. Wilson
(74) *Attorney, Agent, or Firm*—Marcus W. Hammack

(57) ABSTRACT

The present invention is directed toward an apparatus for quickly configuring a jack to raise a load from its rest position. In particular, the present invention provides a jacking mechanism that telescopes from a locked, elevated position to a locked, lowered position in order to situate the jacking mechanism for raising a load. Correspondingly, the present invention provides a jacking mechanism that telescopes from its locked, lowered position to its locked, elevated position for stowing the mechanism between uses.

6 Claims, 1 Drawing Sheet

TELESCOPING JACK UNIT

CROSS-REFERENCE TO PRIOR APPLICATION

This application is a continuation-in-part of U.S. patent application Ser. No. 10/965,363, filed Oct. 14, 2004.

BACKGROUND OF THE INVENTION

1. Field of the Invention

The present invention is directed toward an apparatus for quickly configuring a jack to raise a load from its rest position. In particular, the present invention provides a jacking mechanism that telescopes from a locked, elevated position to a locked, lowered position in order to situate the jacking mechanism for raising a load. Correspondingly, the present invention provides a jacking mechanism that telescopes from its locked, lowered position to its locked, elevated position for stowing the mechanism between uses.

2. Background Information

The use of jacking mechanisms, specifically those used in combination with trailers, is well known in the art. Furthermore, jacks heretofore devised and utilized are known to consist of familiar, expected and obvious structural configurations, notwithstanding the myriad of designs encompassed by the crowded prior art, which has developed for the fulfillment of countless objectives and requirements.

The prior art for jacking mechanisms include U.S. Pat. Nos. 5,184,839, 4,842,252, 4,078,774, and 4,053,174. While these devices fulfill their respective, particularly claimed objectives and requirements, the aforementioned prior art fail to disclose a telescoping jacking mechanism, as claimed in the present invention.

Trailer jacks are a necessity in many industries, including the agriculture, commercial and recreational industries. Jacks are needed to raise and lower trailers with respect to their towing counterparts. Furthermore, these devices must offer support of a trailer load and provide lateral stability to the trailer, while in use.

Two types of trailer jacks predominate the industry, swivel jacks and hydraulic jacks. Swivel jacks operate by cranking a handle to turn a screw which raises and lowers the jack. Hydraulic jacks use hydraulic pressure to raise and lower the jack. Hydraulic jacks may be manually operated or motorized.

Traditional swivel jacks are cumbersome to use and have substantial drawbacks. Foremost, is the time it takes to manipulate the jack from its elevated position to its lowered, ground-engaged position. When a traditional swivel jack is initially engaged with a trailer, the "foot" of the jack is at an extremely elevated or stowed position. In fact, enough space must exist between the foot of the jack and the ground to be able to move and manipulate a trailer without the jack being in a position to contact an obstruction, which would damage the jack. From this extremely elevated position, the jack foot must be hand-cranked all the way to its ground engaged position, prior to even beginning the lifting of the trailer. Thus, raising or lowering the trailer jack requires a significant number of revolutions, in turn, requiring a significant amount of time and effort each time the trailer is engaged or disengaged from a tow vehicle.

By comparison, traditional hydraulic jacks include significant advantages over traditional swivel jacks. Manually operated hydraulic jacks require a lever which must be either rotated or pumped to create the necessary hydraulic pressure to move the jack foot and raise the load. Therefore, the manually operated hydraulic jack suffers from the same substantial impediment as the swivel jack. That is, the time and effort it takes to move the jack foot from its elevated, stowed position to its lowered, ground-engaged position is significant. In contrast, motorized hydraulic jacks operate much more quickly, but they suffer from another drawback, which is the significantly increased cost and complexity of the motorizing device itself.

In view of the limitations associated with the prior art, a substantial need exists for a jack that is affordable and can readily convert from a support position to a stowed position. Applicant's invention, through a novel combination of component pieces, provides such a jack mechanism.

SUMMARY OF THE INVENTION

The general purpose of the present invention, which will be described subsequently in greater detail, is to provide a telescoping jack device, which contains many of the advantages of the prior art along with significant, novel features that result in a jack device that is not anticipated, rendered obvious, suggested, or even implied by any of the known devices, either alone or in combination.

In view of the foregoing, it is an object of the present invention to provide a telescoping jack device that remains vertically aligned while in its engaged position.

It is another object of the present invention to provide a telescoping jack device that remains vertically aligned while in its stowed position.

It is another object of the present invention to provide a telescoping jack device that may quickly and easily be manipulated between its stowed and ground-engaged position.

It is another object of the present invention to provide a telescoping jack device that may remain in its stowed position during transport.

It is another object of the present invention to provide a telescoping jack device that is simple to manufacture.

It is another object of the present invention to provide a telescoping jack device that is affordable.

In satisfaction of these and other related objectives, the present invention provides a device for raising and lowering a trailer. The present invention provides a device, which may remain attached to a trailer at all times. As will be discussed in the specification to follow, practice of the present invention allows for quickly and efficiently manipulating the device from its elevated, stowed position to its ground-engaged position, ready for lifting the trailer.

The preferred embodiment of the telescoping jack, at its most basic level is comprised of a mounting member, a support member, and a telescoping jack member. The mounting member is configured to mount to a typical trailer coupling configuration and is rigidly attached to the support member. The support member is a hollow, cylindrical body containing two vertical slots, positioned 180 degrees apart. Additionally, at the top and bottom of the vertical slots are positioned J-shaped slots. In an alternate embodiment of the present invention, the vertical slot extends through the top of the support member, while maintaining the J-shaped slot near the bottom of the support member. However, in this embodiment, the support member has two short vertical slots, extending through the top of the member, positioned 180 degrees apart, each configured 90 degrees from the original vertical slots. Slideably positioned to the interior of the cylindrical support member is the telescoping jack member. The telescoping jack member is cylindrical in shape and is configured with two pin members positioned 180 degrees apart. The telescoping jack member is further comprised of one of a number of jacking mechanisms as known in the art, such as a swivel or manually operated hydraulic jack.

In operation, the preferred embodiment of the telescoping jack functions as follows. First, the mounting member of the telescoping jack is mounted, in its elevated, stowed position, to the coupling portion of the trailer as known in the art. In this position, the pins attached to the telescoping jack member, are engaged with the upper J-shaped slot, or, in the alternate embodiment, the telescoping jack member pins are engaged with the short, upper slots. In this position, the foot of the jack is well clear of the ground. In order to quickly lower the foot of the jack into its ground engaged position, the telescoping jack member is simply lifted and its attached pins are guided along the upper J-shaped slot, down the vertical slot, and along the bottom J-shaped slot, or in the alternate embodiment, the pins are lifted out of the short vertical slots, guided to and down the long, vertical slot, and along the bottom J-shaped slot. In this position, the foot of the jack is at its ground engaged position, and the jack may be operated in the usual manner to raise the trailer, as known in the art. Once the trailer is raised and mounted to its tow vehicle, the process is reversed, returning the jack to its elevated, stowed position, wherein the foot of the jack is well clear of any obstructions that the driving terrain may offer.

In summary, then, an embodiment of the present invention provides a cost-effective jacking mechanism that can quickly and efficiently be transitioned from its elevated, stowed position to its lowered, ground-engaged position. Correspondingly, the mechanism can just as quickly be transitioned from its lowered, ground-engaged position to its elevated, stowed position, where it may be left attached to the trailer during transport without the fear of damage from ground obstructions.

BRIEF DESCRIPTION OF THE DRAWINGS

Applicant's invention may be further understood from a description of the accompanying drawings, wherein unless otherwise specified, like referenced numerals are intended to depict like components in the various views.

DETAILED DESCRIPTION OF THE PREFERRED EMBODIMENT

Figure 1:
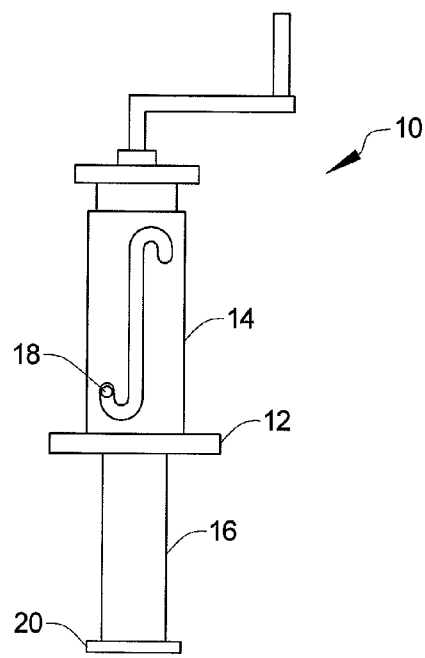
FIG. 1 is a front, plan view of the preferred embodiment of the present invention in its ground engaged position.
Figure 2:
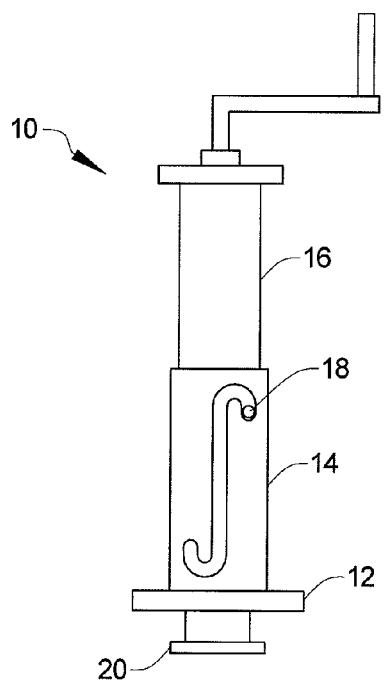
FIG. 2 is a front, plan view of the preferred embodiment of the present invention in its stowed position.
Figure 3:
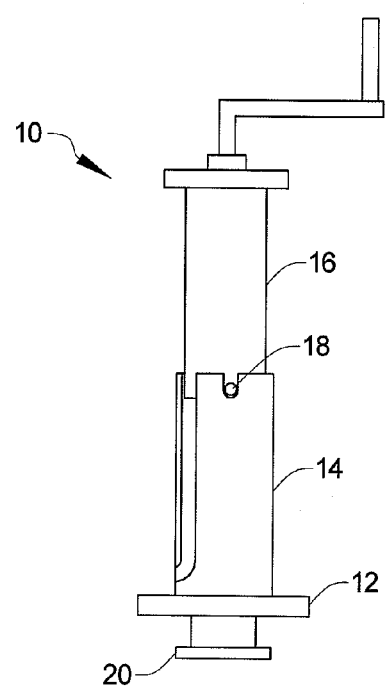
FIG. 3 is a front, plan view of an alternate embodiment of the present invention in its stowed position.

Referring to FIGS. 1, 2, and 3, a telescoping jack is shown and is generally designated by numeral 10. Referring principally to FIGS. 1 and 2, the preferred embodiment of the present invention is shown, in its most basic form, comprising mounting member (12), support member (14), and jack member (16). Mounting member (12) is configured to mount to a typical trailer coupling configuration and is rigidly attached to support member (14). In the preferred embodiment, mounting member (12) is configured of mild steel and welded to support member (14), which is also preferably a mild steel; however, other materials are envisioned with suitable, high strength characteristics, such as various ferrous and non-ferrous metals, thermoformed plastic materials, and injection molded thermoplastic materials. Accordingly, the attachment means between mounting member (12) and support member (14) should be a suitable strength connection, according to the materials used.

Referring back to FIG. 1 and 2, support member (14) is shown as configured in the preferred embodiment. Support member (14) is a hollow, cylindrical body containing two vertical slots, positioned 180 degrees apart. Additionally, at the top and bottom of the vertical slots are positioned, J-shaped slots. Accordingly, the wall thickness of support member (14) must be adequate to support any transverse loading associated with the lifting of a loaded trailer.

Referring to FIG. 3, an alternate embodiment of the present invention is depicted, wherein the vertical slot in support member (14) extends through the top portion of support member (14) itself, while maintaining the J-shaped slot near the bottom portion of support member (14). Additionally, support member (14) has two short vertical slots, extending through the top of support member (14), positioned 180 degrees apart, each configured 90 degrees form the original vertical slots.

Referring principally to FIG. 2, jack member (16) is shown slideably positioned to the interior of support member (14). Jack member (16) is cylindrical in shape and is configured with two pin members (18), positioned 180 degrees apart. In the preferred embodiment, pin members (18) are comprised of hardened steel and welded to jack member (16); however, other suitable materials and attachment means are envisioned as would be apparent to one skilled in the art. Jack member (16) is further, internally comprised of one of a number of jacking mechanisms as known in the art, such as a swivel or manually operated hydraulic jack.

In operation, the preferred embodiment of telescoping jack (10) functions as follows. First, mounting member (12) of telescoping jack (10) is mounted, in its elevated, stowed position (as shown in FIG. 2) to the coupling portion of the trailer, as known in the art. As shown in FIG. 2, in this position, pins (18) attached to jack member (16), are engaged with the upper J-shaped slot, or, in the alternative embodiment, as shown in FIG. 3, jack member pins (18) are engaged with the short, upper slots of support member (14). In either embodiment, foot member (20) of telescoping jack (10) is well clear of the ground. In order to quickly lower foot member (20) of jack (10) into its ground engaged position, as shown in FIG. 1, jack member (16) is simply lifted and pins (18) are guided along the upper J-shaped slot, down the vertical slot, and along the bottom J-shaped slot of support member (14), in the preferred embodiment. In the alternate embodiment, pins (18) are lifted out of the short vertical slots, guided to and down the long, vertical slot, and along the bottom J-shaped slot. In this position, foot member (20) of jack (10) is at its ground engaged position, and jack (10) may be operated in the usual manner, according to the specific jacking mechanism incorporated, to raise the trailer. Once the trailer is raised and mounted to its tow vehicle, the process is reversed, returning jack (10) to its elevated, stowed position, wherein the foot (20) of jack (10) is well clear of any obstructions that the driving terrain may offer.

Although the invention has been described with reference to specific embodiments, this description is not meant to be construed in a limited sense. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention.

I claim:

1. A telescoping jack, comprising:
   a mounting member, said mounting member being configured to mount to a trailer coupler;
   a support member, said mounting member being rigidly attached to said support member, said support member being cylindrical in shape and having a proximal and distal end, said support member having a first vertical slot extending longitudinally from near said proximal end to near said distal end, said support member having a first J-shaped slot at said proximal end extending from said vertical slot, said support member having a first upside-down J-shaped slot at said distal end extending from said vertical slot; and
   a jack member being cylindrical in shape and having a proximal end and a distal end, said jack member having a first pin member rigidly attached near said proximal end of said jack member, said jack member being telescopically engaged with said support member, said first pin member being configured for slideable engagement with said first vertical slot, said jack member having a foot member at said proximal end of said jack member, said jack member having an internal jacking mechanism actuated from said distal end.

2. The telescoping jack of claim 1 wherein said support member is configured with a second vertical slot, identical to said first vertical slot, positioned 180 degrees from said first vertical slot, said support member further having a second J-shaped slot, identical to said first J-shaped slot, positioned 180 degrees from said first J-shaped slot, said support member further having a second upside down J-shaped slot, identical to said first upside down J-shaped slot, positioned 180 degrees from said first upside down J-shape slot.

3. The apparatus of claim 2 wherein said jack member further comprises a second pin member, identical to said first pin member, positioned 180 degrees from said first pin member.

4. A telescoping jack, comprising:
   a mounting member, said mounting member being configured to mount to a trailer coupler;
   a support member, said mounting member being rigidly attached to said support member, said support member being cylindrical in shape and having a proximal and distal end, said support member having a first long vertical slot extending longitudinally from near said proximal end through said distal end, said support member having a first J-shaped slot at said proximal end extending from said vertical slot, said support member having a first short vertical slot at said distal end positioned 90 degrees from said first long vertical slot; and
   a jack member being cylindrical in shape and having a proximal end and a distal end, said jack member having a first pin member rigidly attached near its said proximal end of said jack member, said jack member being telescopically engaged with said support member, said first pin member being configured for slideable engagement with said first vertical slot, said jack member having a foot member at said proximal end of said jack member, said jack member having an internal jacking mechanism actuated from said distal end.

5. The telescoping jack of claim 4 wherein said support member is configured with a second vertical slot, identical to said first vertical slot, positioned 180 degrees from said first vertical slot, said support member further having a second J-shaped slot, identical to said first J-shaped slot, positioned 180 degrees from said first J-shaped slot, said support member further having a second short vertical slot, identical to said first short vertical slot, positioned 180 degrees from said first short vertical slot.

6. The apparatus of claim 5 wherein said jack member further comprises a second pin member, identical to said first pin member, positioned 180 degrees from said first pin member.

* * * * *